United States Patent [19]
Lee et al.

[11] Patent Number: 6,151,358
[45] Date of Patent: Nov. 21, 2000

[54] METHOD AND APPARATUS, AND COMPUTER PROGRAM FOR PRODUCING FILTER COEFFICIENTS FOR EQUALIZERS

[75] Inventors: Yumin Lee, Schaumburg; Vipul Desai, Hoffman Estates, both of Ill.

[73] Assignee: Motorola, Inc., Schaumburg, Ill.

[21] Appl. No.: 09/375,181

[22] Filed: Aug. 11, 1999

[51] Int. Cl.[7] .............................. H03H 7/30; H03H 7/40; H03K 5/159
[52] U.S. Cl. ............................................ 375/232; 708/323
[58] Field of Search ..................................... 375/231, 232, 375/340, 341, 342, 343; 708/323, 322

[56] References Cited

U.S. PATENT DOCUMENTS

| | | |
|---|---|---|
| 3,974,449 | 8/1976 | Falconer . |
| 4,004,226 | 1/1977 | Qureshi et al. . |
| 4,271,525 | 6/1981 | Watanabe et al. . |
| 4,328,585 | 5/1982 | Monsen . |
| 5,065,411 | 11/1991 | Muto . |
| 5,068,873 | 11/1991 | Murakami . |
| 5,283,811 | 2/1994 | Chennakeshu et al. . |
| 5,436,929 | 7/1995 | Kawas Kaleh . |
| 5,790,598 | 8/1998 | Moreland et al. . |
| 6,006,110 | 12/1999 | Raleigh ................................. 455/561 |

*Primary Examiner*—Don N. Vo
*Assistant Examiner*—Phuong Phu
*Attorney, Agent, or Firm*—K. Cyrus Khosravi

[57] ABSTRACT

Apparatus, computer program, and method for producing filter coefficients for an equalizer, the method includes the steps of: estimating a response (810) of a communication channel to a signaling pulse; estimating an autocorrelation (820) of noise and interference of the communication channel; computing an array (830) based on the estimation of the response of the communication channel to the signaling pulse and the estimation of the autocorrelation of the noise and interference of the communication channel; designating (840) at least one pivot position in the array; recursively performing the steps of: transforming the array (850) by a sequence of operations; storing (860) at least one element of the at least one pivot position; shifting (870) the at least one element of the at least one pivot position, thereby providing a shifted transformed array; determining (890) whether the shifted transformed array contains at least one non-zero element; and calculating (880) the filter coefficients based on the stored at least one element and the estimation of the response of the communication channel.

28 Claims, 5 Drawing Sheets

METHOD AND APPARATUS, AND COMPUTER PROGRAM FOR PRODUCING FILTER COEFFICIENTS FOR EQUALIZERS

FIELD OF THE INVENTION

The present invention generally relates to communication systems and more particularly, relates to producing filter coefficients for equalizers.

BACKGROUND OF THE INVENTION

Most modern communication systems transmit data over time-varying, dispersive communication channels. Among the distortions introduced by the channel, inter-symbol interference (ISI) is significant because it severely degrades the performance of the receiver. To mitigate the effects of ISI, many receivers use equalizers. The general architecture of an equalizer comprises filters, adders for combining the output of the filters, and decision devices. The filters are linear finite-impulse-response (FIR) with complex coefficients. A decision device operates on complex inputs and outputs complex values that are representative of the signal constellation points of the modulation scheme.

In general, the equalizer filter coefficients are jointly optimized according to a criterion suitable for the communication system. Determining the optimal equalizer filter coefficients is a computationally intensive task because it requires the solution to a large set of linear equations. Two general approaches are commonly used today: the first approach is the adaptive approach, and the second is the direct matrix inversion approach.

In the adaptive approach, the equalizer filter coefficients are first set to some initial values. The output error signal, defined as the difference between the input and the output of the equalizer decision device, is then used to recursively adjust the equalizer filter coefficients toward the optimal settings. Depending on the coefficient adaptation algorithm employed, a training sequence may be required. A training sequence is a known set of symbols that the transmitter sends along with the data. In U.S. Pat. No. 5,068,873 issued to Murakami, the least mean square (LMS) or Kalman filter algorithm is used for adaptation. A training sequence is required for that approach. The LMS algorithm requires $O(M)$ complex operations per iteration, where M is the total number of coefficients to optimize. Furthermore, a large number of iterations (>>M) is required for the equalizer filter coefficients to converge to the optimal values. While Kalman filter algorithm converges faster to the optimal solution, it requires $O(M^2)$ operations per iteration. Similarly, U.S. Pat. No. 5,283,811 issued to Chennankeshu, et al. employs the fast Kalman algorithm for decision-feedback equalizer (DFE) coefficient adaptation. U.S. Pat. No. 3,974,449 issued to Falconer describes a DFE adaptation method that does not use training sequences.

In the direct matrix inversion approach, a response of the channel to the signaling pulse is first estimated. This estimate is the response, filtered by the receiver filter, of the channel to the transmitter spectral-shaping pulse. The equalizer coefficients are then obtained from the estimate of the response of the channel to the signaling pulse by solving a set of complex-valued linear equations. In general, the solution of these equations requires the inversion of an M×M square matrix, which requires $O(M^3)$ complex multiplications. U.S. Pat. No. 5,436,929 issued to Kawas Kaleh utilizes positive-definite and Hermitian symmetric properties of the square matrix so that a Cholesky decomposition can be used. The Cholesky decomposition requires $O(M^3)$ complex multiplications to factor a positive-definite, Hermitian symmetric matrix into the product of lower and upper triangular matrices. The upper triangular matrix is equal to the Hermitian transpose of the lower triangular matrix. The triangular matrices are easily invertible, requiring $O(M^2)$ multiplications. U.S. Pat. No. 5,790,598 issued to Moreland, et al. describes a recursive method using the Cholesky decomposition. Both of these techniques still require $O(M^3)$ complex multiplications. Finally, Al-Dhahir and Cioffi developed an optimization method for the DFE using a fast Cholesky decomposition. The algorithm requires approximately $O(N_f N_b)$ complex multiplications, where $N_f$ and $N_b$ are, respectively, the number of feedforward filter (FFF) and feedback filter (FBF) coefficients. This method, however, can only be used under the following restrictions:

1) The discrete-time noise at the input of the DFE is white;
2) The number of feedback filter coefficients is equal to the number of taps in the estimated response of the channel; and
3) The decision delay of the DFE is equal to $N_f - 1$.

If these assumptions are violated, the coefficients obtained by this method are significantly sub-optimal, and the performance of the DFE is greatly degraded.

It can therefore be seen that in general, the optimization of the equalizer coefficients require at least $O(M^3)$ complex multiplies if direct matrix inversion is used. The complexity is even higher for the adaptive approach due to the large number of iterations required. Although a lower complexity $O(N_f N_b)$ approach exists, it is applicable only under certain restrictions. Thus there is a need for efficient method and apparatus for computing the equalizer filter coefficients without any restrictions.

DESCRIPTION OF THE PREFERRED EMBODIMENT

Figure 1:
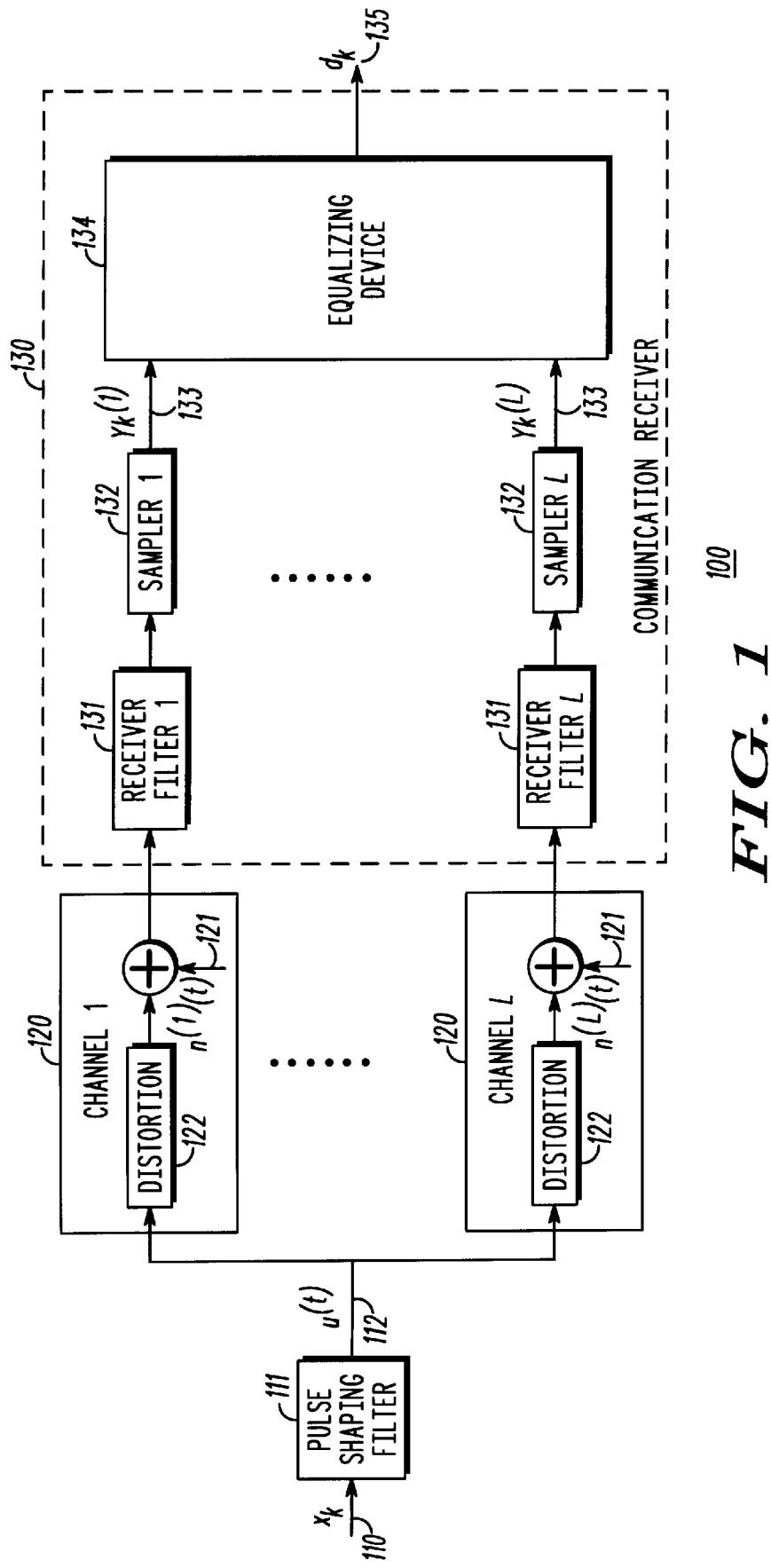
FIG. 1 represents the block diagram for illustrating, transmitting and receiving data in a communication system in accordance with the present invention.

Inter-symbol interference (ISI) introduced by multipath propagation significantly degrades the performance of a high-speed communication system. Equalization is an effective method for mitigating the effects of ISI. In an equalizer, linear finite-impulse-response (FIR) filters are used. In a preferred embodiment, a decision-feedback equalizer (DFE) which comprises a feedforward filter (FFF) with $N_f$ coefficients and a feedback filter (FBF) with $N_b$ coefficients is used. The coefficients of these FIR filters are jointly optimized according to a criterion suitable for the communication system. The optimization of these coefficients can be achieved using the adaptive approach or direct matrix inversion approach. Since both approaches are computationally intensive, efficient optimization methods with good performance under all circumstances remain to be found.

The present invention provides a method and apparatus for determining equalizer filter coefficients. The method and apparatus in accordance with the present invention can be implemented by many communication-receiving devices. In the present invention, the equalizer filter coefficients are obtained from an estimate of response of the channel to the signaling pulse and an estimate of the noise and interference autocorrelation. The present invention provides for: an initializer, which initializes various components in the present invention; a processor, which computes intermediate results; a memory unit, which stores the intermediate results; and an arithmetic unit, which produces the equalizer coefficients based on the intermediate results. Because of its novel structure, the method and apparatus of the present invention achieves the performance as prior arts with significantly lower complexity.

Because this invention significantly reduces the complexity of the direct matrix inversion approach, it greatly expands the role of the equalizer into applications that could not afford the complexity of equalizer filter coefficient generation. These applications include many wireless communication products that are limited by processing capabilities and power consumption, as well as low-cost, high-speed voiceband modems. In addition, this invention can also be used to obtain initial values for adaptive approaches. By having better initial values, the number of iterations needed is reduced and/or the adaptive algorithm can be simplified. Thus, the invention has many applications with current and future communication systems.

There are two important advantages of the present invention. First, because of its novel structure, the complexity of the present invention is significantly lower than the prior arts. Table A summarizes the number of digital signal processor (DSP) operations required for the present invention and prior arts for the preferred embodiment. It can be seen that the number of operations for the present invention is proportional to $N_f^2$, where $N_f$ is the number of feedforward filter coefficients, whereas for the prior arts, the number of operations is proportional to $N_f^3$. In a high-speed, low-power device such as a wireless communication receiver, fast and efficient methods for computing these coefficients are highly desirable. Because this invention significantly reduces the complexity of the direct matrix inversion approach, it greatly expands the role of the equalizer into applications that could not afford the complexity of equalizer coefficient generation. These applications include many wireless communication products that are limited by processing capabilities and power consumption, as well as low-cost, high-speed voiceband modems. In addition, this invention can also be used to obtain initial values for adaptive approaches. By having better initial values, the number of iterations needed is reduced and/or the adaptive algorithm can be simplified.

TABLE A

Complexities associated with prior art techniques on a single arithmetic logic unit digital signal processor. Matrix size is $N_f \times N_f$.

| Technique | Complexity Operations |
|---|---|
| Direct Matrix Inversion (Prior Arts) | $>4N_f^3$ |
| The Present Invention | $\sim 4.5 N_f^2 + 150 N_f$ |

Second, the applicability of the present invention is unrestricted. Unlike some prior arts, the present invention can be applied to any configuration of the equalizer. This unrestricted applicability makes the present invention extremely suitable for applications where both flexibility and low-complexity are important considerations. These applications include adaptive communication-receiving devices that are reconfigured according to different operating environments.

FIG. 1, numeral 100, illustrates a block diagram of a communication system in accordance with the present invention. As shown in FIG. 1, the modulation symbols $x_k$ 110 are filtered by a transmitter pulse-shaping filter 111 to generate a modulated signal u(t) 112. The modulated signal u(t) 112 is transmitted over at least one communication channel 120. The communication channel 120 includes additive interference and thermal noise 121 as well as distortions 122 such as frequency translation, amplification, multipath propagation, linear and nonlinear distortions, delay, frequency and carrier phase offsets, and filtering. The communication receiver 130 comprises a plurality of receiver filters 131, one for each channel, a plurality of signal samplers 132, one for each channel, and an equalizing device 134. Each receiver filter 131 is coupled to the output of a unique channel 120. The output of each receiver filter 131 is sampled using a signal sampler 132 at a rate of N samples per symbol-period to generate the filtered received signals 133 $y_k^{(1)}, y_k^{(2)}, \ldots, y_k^{(L)}$, where L is the number of communication channels. The equalizing device 134 is coupled to the outputs of all signal samplers 132. The equalizing device 134 processes the filtered received signals 133 and generates a demodulated symbols 135 $d_k$.

Figure 2:
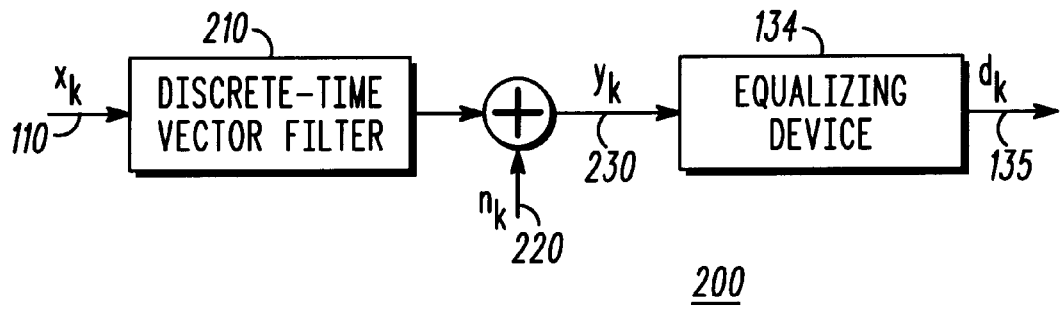
FIG. 2 is a block diagram of a discrete-time system that is equivalent to the communication system in FIG. 1.

FIG. 2, numeral 200, is a block diagram illustrating a discrete-time linear vector system that is equivalent to the communication system in accordance with the present invention. Samples in each symbol-period of all filtered received signals 133 can be stacked up together and expressed as a discrete-time sequence of (LN)×1 complex-valued vectors 230 $y_k$, with the time spacing between vectors equal to the symbol-period. The discrete-time complex-vector-valued signal 230 $y_k$ is referred to as the "received signal." Similarly, samples of the additive interference and thermal noise 121 in each communication channel 120 can also be stacked up and expressed as a discrete-time complex-vector-valued signal 220 $n_k$. The discrete-time complex-vector-valued signal 220 $n_k$ is referred to as the "interference-plus-noise." The cascade of the transmitter pulse-shaping filter 111, communication channel 120, receiver filters 131, and signal samplers 132 is equivalent to a complex-valued linear discrete-time vector filter 210. As shown in FIG. 2, the received signal 230 $y_k$ is equivalent to the modulation symbols 110 $x_k$ filtered by the complex-valued linear discrete-time vector filter 210 and corrupted by the interference-plus-noise 220 $n_k$. Mathematically, $y_k$ 230 is related to $x_k$ 110 and $n_k$ 220 by $$y_k = \sum_{j=0}^{v} p_j x_{k-j} + n_k \qquad (1)$$

where $p_j$, $j=0,1,\ldots,v$, are (LN)×1 complex-valued vectors referred to as the "response of the channel to the signaling pulse," and $v+1$ is length of the response of the channel to the signaling pulse. Since $y_k$ 230 is an equivalent representation of the filtered received signals 133, the equalizing device 134 is a device whose input is the complex-vector-valued signal $y_k$ 230 wherein the output is the demodulated symbols 135 $d_k$.

Figure 3:
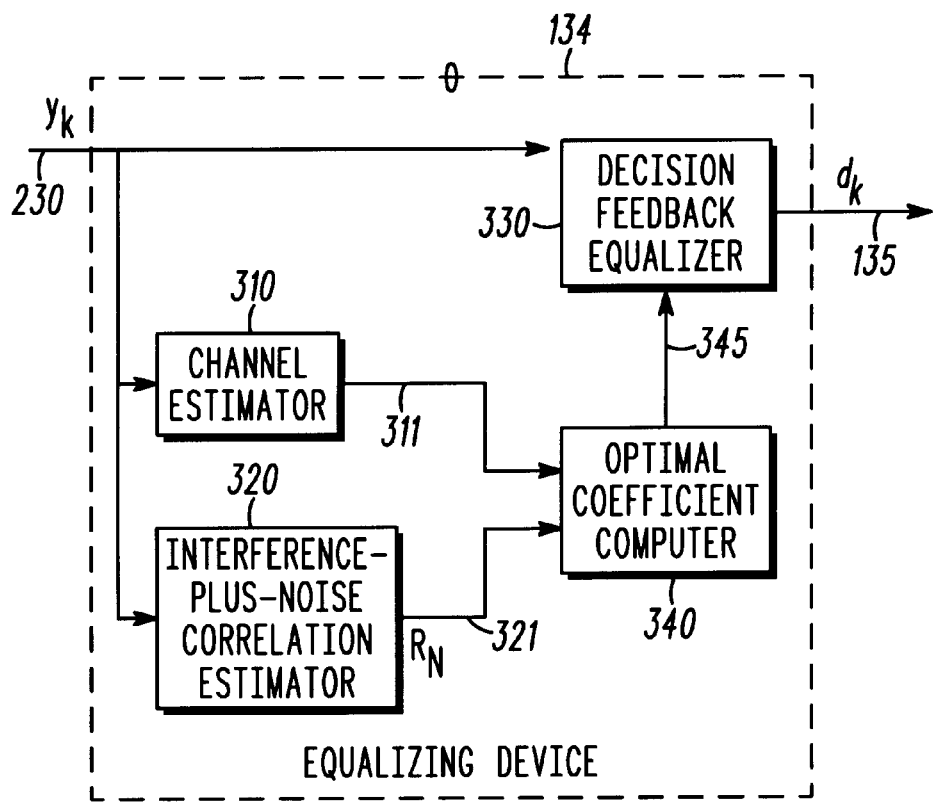
FIG. 3 is a detailed representation of the equalizing device in accordance with the present invention.

FIG. 3, numeral 300, is a detailed block diagram representation of the equalizing device 134 in accordance with the present invention. According to the preferred embodiment of the present invention, the equalizing device 134 comprises a channel estimator 310, an interference-plus-noise correlation estimator 320, a decision-feedback equalizer 330, and an optimal coefficient computer 340. The decision-feedback equalizer 330 is referred to as the "DFE." The channel estimator 310 produces an estimate 311 $p_j$ of the response of the channel to the signaling pulse from the received signal 230 $y_k$. The interference-plus-noise correlation estimator 320 estimates, from the received signal 230 $y_k$, an estimated autocorrelation 321 $R_N$ of the interference-plus-noise 220 $n_k$. The interference-plus-noise autocorrelation estimate 321 is an $(LN_f) \times (LN_f)$ complex-valued matrix defined as $$R_N = E[n_k n_k^H] \qquad (2)$$

where "H" denotes the Hermitian transposition of a matrix and "E" denotes the statistical expectation, and $N_f$ is an integer multiple of N. The optimal coefficient computer 340 produces the optimal filter coefficients 345 for the DFE 330 based on the estimated response 311 $p_j$ of the channel and the interference-plus-noise autocorrelation estimate 321 $R_N$. The DFE 330 performs equalization of the received signal 230 $y_k$ and generates the demodulated symbols 135 $d_k$.

Figure 4:
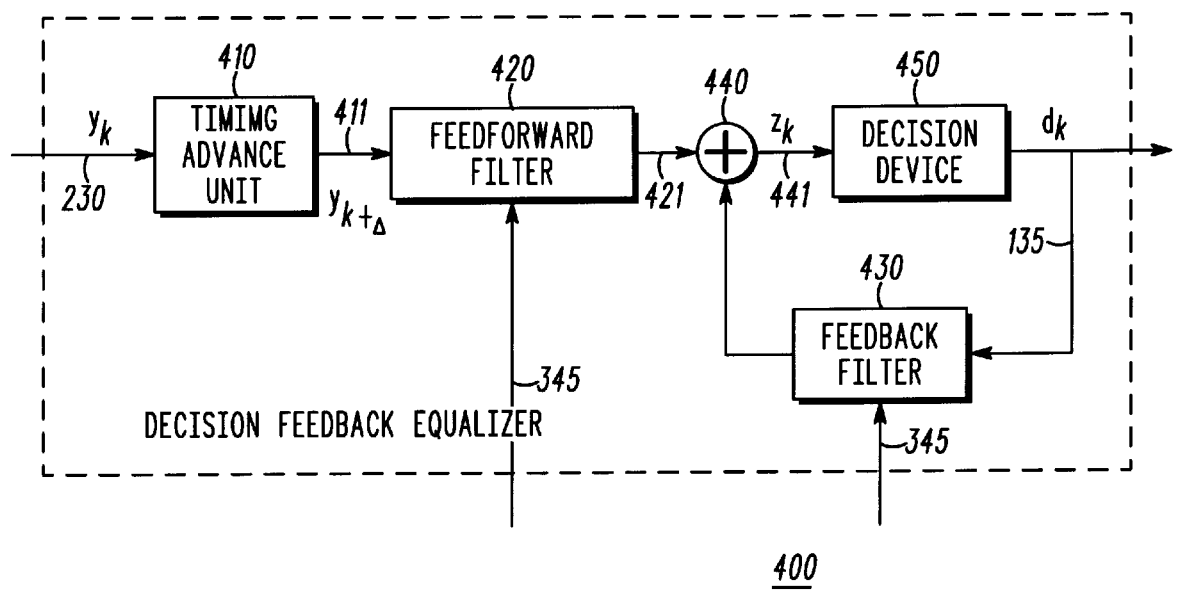
FIG. 4 represents the details of the decision-feedback equalizer.

FIG. 4, numeral 400 is a block diagram illustrating the details of the DFE 330. The DFE 330 consists of a timing advance unit 410, a linear finite-impulse response (FIR) vector feedforward filter (FFF) 420, a linear FIR scalar feedback filter (FBF), an adder 440, and a decision device 450. The timing advance unit 410 is coupled to the received signal 230 $y_k$, and advances its input signal by $\Delta$ symbol-periods. The integer $\Delta$ is referred to as the "decision delay." The time-advanced signal 411 $y_{k+\Delta}$ is then filtered by the FFF 420. The FFF 420 uses the optimal filter coefficients 345 to produce a complex-valued output 421. The FBF 430 also uses the optimal filter coefficients 345 to filter the output 135 of the decision device 450 and consists of $N_b$ complex coefficients, spaced one symbol-period apart. The adder 440 then forms the DFE output 441 $z_k$, which is a linear combination of the components of the received signal 230 $y_k$ and decisions 135 $d_k$. The DFE output 441 $z_k$ is then used by the decision device 450 to generate the decisions 135 $d_k$. The decision device 450 generates decisions or sequence of decisions pertaining to the modulation scheme. Examples include a memoryless thresholding device and a Viterbi sequence estimator.

Figure 5:
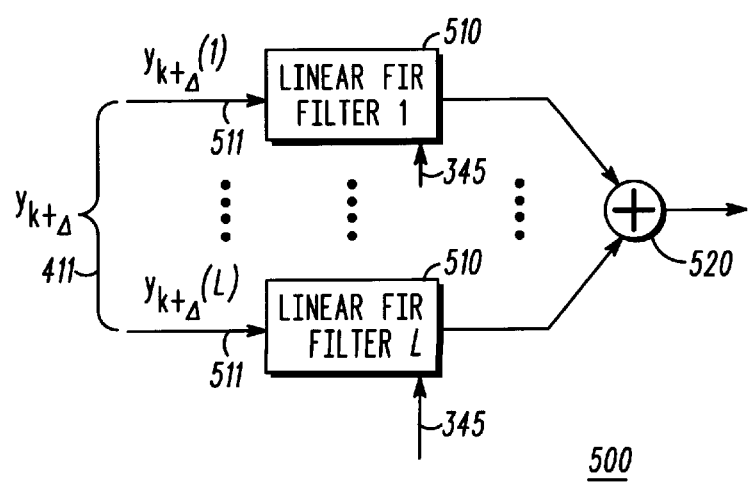
FIG. 5 represents a block diagram of the feedforward filtering of a plurality of communication channels.

FIG. 5, numeral 500, is a block diagram illustrating the details of the FFF 420. The FFF 420 consists of a plurality of linear FIR filters 510, and an adder 520. Each FIR filter 510 uses the optimal filter coefficients 345. In FIG. 5, the time-advanced received signal 411 $y_{k+\Delta}$ is shown as a plurality of discrete-time scalar signals 511 $y_{k+\Delta}^{(1)}, y_{k+\Delta}^{(2)}, \ldots, y_{k+\Delta}^{(L)}$, with the time spacing between samples of each component signal equal to (1/N) of a symbol-period. Each linear FIR filter 510 of the FFF 420 consists of $N_f$ complex-valued scalar coefficients spaced (1/N) of a symbol-period apart. The outputs of the plurality of linear FIR filters 510 are summed by the adder 520. The FFF 420 and FBF 430 together comprise a total of $(LN_f + N_b)$ complex coefficients. These coefficients are produced by the optimal coefficient computer 340 based on the channel estimate 311 $p_j$ and interference-plus-noise autocorrelation estimate 321 $R_N$.

Figure 6:
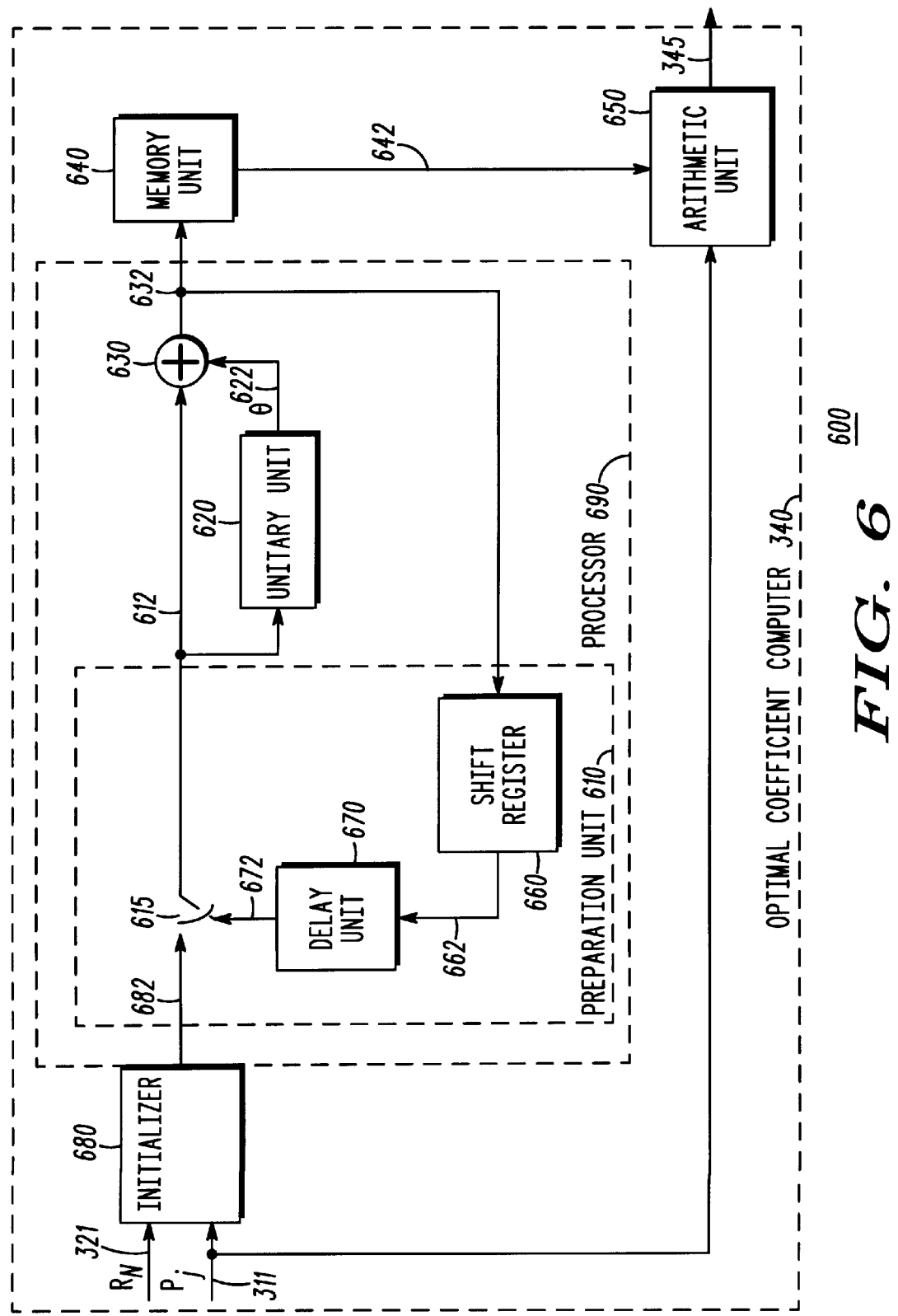
FIG. 6 represents the block diagram of the optimal coefficient computer of FIG. 3 in accordance with the present invention.

FIG. 6, numeral 600, is a block diagram of an optimal coefficient computer 340 in accordance with the present invention. It comprises an initializer 680, a processor 690, a memory unit 640, and an arithmetic unit 650. The initializer 680 produces an array 682 based on the estimate of the channel response 311 and the estimate of the interference-plus-noise autocorrelation 321. Certain positions in the array 682 are designated as pivot positions, which represent elements with special significance and are used directly for producing the equalizer coefficients. The processor 690 transforms the array 682 using a sequence of operations to produce a transformed array. In the preferred embodiment, the sequence of operations is matrix multiplications. The processor 690 further comprises a preparation unit 610, a unitary unit 620, and a multiplier 630. The unitary unit 620 produces a matrix $\Theta$ 622 based on the output 612 of the switch 615. The multiplier 630 then multiplies the matrix $\Theta$ 622 and the output 612 of the switch 615. The multiplier output 632 is the transformed array. Elements in the pivot positions of the transformed array 632 are stored in the memory unit 640. The multiplier output, namely, transformed array 632 is also fedback to the shift register 660. The shift register 660 shifts the elements in the pivot positions of the transformed array 632 and produces a shifted transformed array 662, which is stored in the delay unit 670. Initially, the switch 615 receives the array 682 from the initializer 680. Subsequently, the switch receives the stored shifted transformed array 672 from the delay unit 670. The arithmetic unit 650 produces the equalizer coefficients based on the output 642 of the memory unit 640 and the estimate of the channel response 311.

Figure 7:
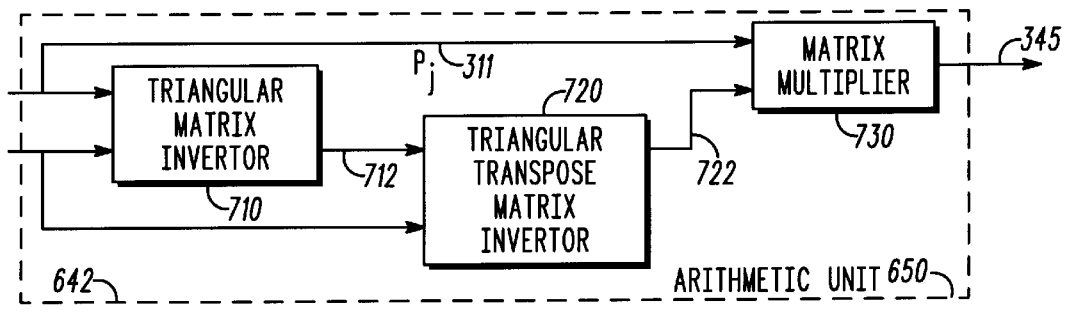
FIG. 7 is a block diagram representation of the arithmetic unit of FIG. 6 in accordance with the present invention.

FIG. 7, numeral 700, is a block diagram representing the arithmetic unit 650. The arithmetic unit 650 comprises a triangular matrix inverter 710, a triangular transpose matrix inverter 720, and a matrix multiplier 730. The triangular matrix inverter 710 is responsive to the output 642 of the memory unit 640 and the estimate of the channel to a signaling pulse 311 and produces an intermediate output 712. The triangular transpose matrix inverter 720 is responsive to the intermediate output 712 and to the output 642 of the memory unit 640 and produces a signal 722. The matrix multiplier 730 multiplies the signal 722 and the estimate of the response of the channel to the signaling pulse 311 to produce the filter coefficients 345.

The operation of the optimal coefficient computer 340 is described below. In the preferred embodiment, it is assumed that L=1 and N=1. These are reasonable assumptions because they correspond to the most commonly used symbol-spaced equalizer. Furthermore, it is also assumed that $$\sum_{j=0}^{v} |p_j|^2 + R_{00} = 1 \qquad (3)$$

where $R_{ij}$ denotes the (i,j)-th element of the interference-plus-noise autocorrelation estimate 321 $R_N$. Initially, the switch 615 receives the array 682 from the initializer 680. The array 682 represents a generator matrix $G^{(0)}$. The generator matrix $G^{(0)}$ can have more columns than rows, or more rows than columns. If $G^{(0)}$ has more columns than rows, it is computed according to the following equation:

$$R - ZRZ^H = \{G^{(0)}\}^H J G^{(0)} \quad (4)$$

where R is a square matrix based on the channel and interference-plus-noise autocorrelation estimates, Z is a triangular matrix whose main diagonal elements are all zeros, J is a diagonal signature matrix whose main diagonal elements are either 1 or −1, and "H" denotes Hermitian transposition. In the preferred embodiment, $G^{(0)}$ has more rows than columns, and is computed according to the following equation:

$$R - ZRZ^H = G^{(0)} J \{G^{(0)}\}^H \quad (5)$$

In the preferred embodiment, the signature matrix is defined as $$J = \begin{bmatrix} 1 & 0 & 0 & 0 \\ 0 & 1 & 0 & 0 \\ 0 & 0 & -1 & 0 \\ 0 & 0 & 0 & -1 \end{bmatrix} \quad (6)$$

Furthermore, for the preferred embodiment, the output 682 of the initializer 680 represents an $N_f$-by-4 complex matrix $G^{(0)}$, with each column computed according to the following equations:

$$G_{i0}^{(0)} \equiv \sum_{j=i}^{v} p_j p_{j+i}^* + R_{i0}^*, \, i = 0 \ldots (N_f - 1) \quad (7)$$

$$G_{i1}^{(0)} \equiv \frac{1}{\sqrt{1+\delta}} p_{N_f + N_b - i}, \, i = 0 \ldots (N_f - 1) \quad (8)$$

$$G_{i2}^{(0)} \equiv \frac{1}{\sqrt{1+\delta}} p_{N_f - i} \, i = 0 \ldots (N_f - 1) \quad (9)$$

$$G_{i3}^{(0)} \equiv \begin{cases} 0 & i = 0 \\ G_{i0}^{(0)} & i = 1 \ldots (N_f - 1) \end{cases} \quad (10)$$

where $p_j$ are the channel estimates, $R_{ij}$ is the (i,j)-th element of the interference-plus-noise correlation estimate, and δ is a positive real number selectively chosen to improve performance, v+1 is length of the response of the channel to the signaling pulse, $N_f$ is the number of rows of $G^{(0)}$, and $N_f + N_b$ represents the total number of filter coefficients. The first column the output array 682 of the initializer 680 is designated as the pivot positions.

Once the output 612 of the switch is available, the unitary unit 620 computes a matrix Θ 622. If the generator matrix $G^{(0)}$ has more columns than rows, the matrix Θ 622 is computed according to $$\Theta^H J \Theta = J, \quad (11)$$

where J is the signature matrix. For the preferred embodiment, the matrix Θ 622 is computed according to $$\Theta J \Theta^H = J, \quad (12)$$

where J is the signature matrix given in Equation (6). In the preferred embodiment, the matrix Θ 622 can be a rotation matrix or a reflection matrix. The rotation matrix is defined according to the following equation:

$$\Theta = \Omega_1 \Omega_2 \Omega_3 \quad (13)$$

where $$\Omega_1 \equiv \frac{1}{\sqrt{|G_{1,0}|^2 - |G_{1,3}|^2}} \begin{bmatrix} G_{1,0} & 0 & 0 & -G_{1,3} \\ 0 & 1 & 0 & 0 \\ 0 & 0 & 1 & 0 \\ -G_{1,3}^* & 0 & 0 & G_{1,0} \end{bmatrix}, \quad (14)$$

$$\Omega_2 \equiv \frac{1}{\sqrt{|M_{1,0}|^2 - |M_{1,2}|^2}} \begin{bmatrix} M_{1,0} & 0 & -M_{1,2} & 0 \\ 0 & 1 & 0 & 0 \\ -M_{1,2}^* & 0 & M_{1,0} & 0 \\ 0 & 0 & 0 & 1 \end{bmatrix}, \quad (15)$$

and $$\Omega_2 \equiv \frac{1}{\sqrt{|V_{1,0}|^2 - |V_{1,1}|^2}} \begin{bmatrix} V_{1,0} & -V_{1,1} & 0 & 0 \\ V_{1,1}^* & V_{1,0} & 0 & 0 \\ 0 & 0 & 1 & 0 \\ 0 & 0 & 0 & 1 \end{bmatrix}. \quad (16)$$

In Equation (14), $G_{1,j}$ represents the j-th element of the first nonzero row of the array output 612 G of the switch 615. In Equation (15), $M_{1,j}$ denotes the j-th element of the first nonzero row of the matrix $M = G\Omega_1$. And in Equation (16), $V_{1,j}$ denotes the j-th element of the first nonzero row of the matrix $V = G\Omega_1 \Omega_2$.

Similarly the reflection matrix is defined as $$\Theta \equiv J - \frac{2u^H J u}{\|u\|_J^2}, \quad (17)$$

where $$u \equiv g - \|g\|_J 1, \quad (18)$$

$$\|u\|_J \equiv \sqrt{u J u^H}, \quad (19)$$

$$\|g\|_J \equiv \sqrt{g J g^H}, \quad (20)$$

In Equations (18) and (20), g is a row vector representing the first non-zero row of the output array 612 of the switch 615, J is the signature matrix, 1 is a row vector whose first component is a one and all the other component are zeros, and "H" denotes Hermitian transposition.

In the preferred embodiment, the multiplier 630 post-multiplies the output of the switch 612 by the matrix 622 Θ and produces the transformed array 632. Elements in the pivot positions, namely the first column, of the transformed array 632 is stored in the memory unit 640. The transformed array 632 is also fedback to the shift register 660. The shift register 660 shifts the first column of its input downwards by one element, and produces the shifted transformed array 662. When the shifted transformed array 662 is available, it is latched into the delay unit 670. Switch 615 is then disconnected from the initializer 682 and connected to the delay unit 670 and receives the stored shifted transformed array 672 from the delay unit. This process is repeated until the stored shifted transformed array 672 in the delay unit 670 is a matrix of all zeros.

At the time when the stored shifted transformed array 672 of the delay unit 670 is a matrix of all zeros, the arithmetic unit 650 begins to produce the equalizer coefficients based on the estimation of the channel 311 and the output 642 of the memory unit 640. For the preferred embodiment, the output 642 of the memory unit 640 represents a $(N_f \times N_f)$ lower triangular matrix denoted as L. The triangular matrix inverter 710 inverts L and multiplies the inverse by elements of the estimate of the channel to a signaling pulse 311.

The triangular transpose matrix inverter 720 operates similarly to the triangular matrix inverter 710. The triangular transpose matrix inverter 720 computes the inverse of $L^H$, where H represents the Hermitian transpose, and applies the inversion to the intermediate signal 712 to produce signal 722.

The output of the matrix multiplier 730 are the filter coefficients 345. For the preferred embodiment, the matrix multiplier 730 multiplies elements of the estimate of the channel to a signaling pulse 311 by the signal 722. The resulting product is the filter coefficient 345.

Figure 8:
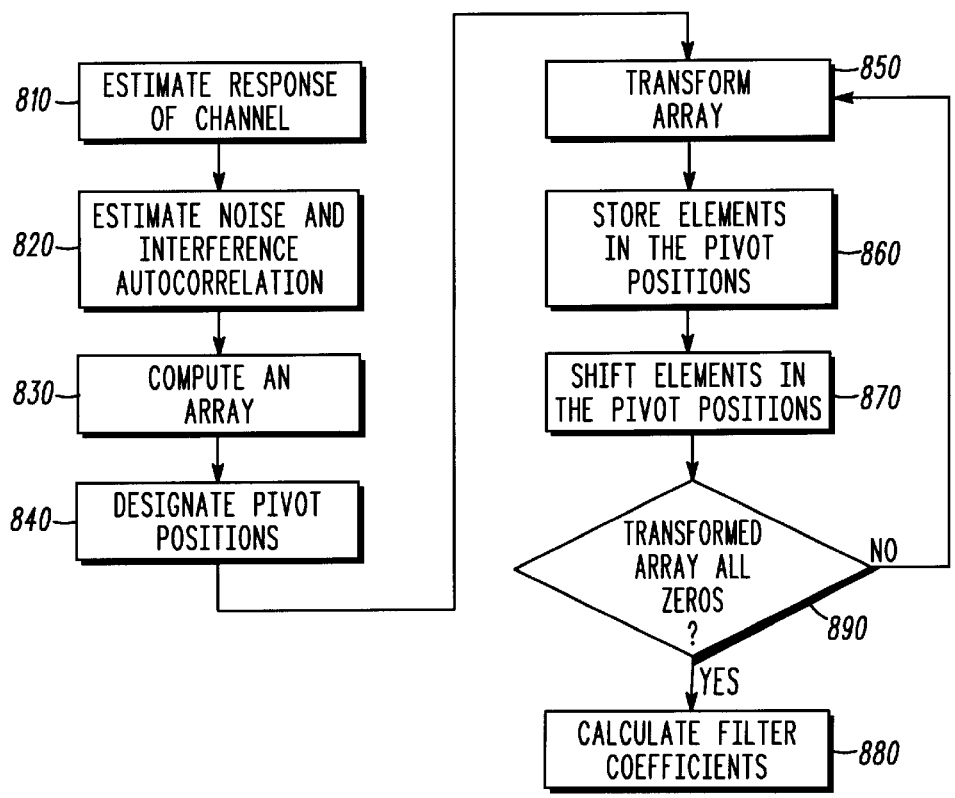
FIG. 8 is a graphic representation of one embodiment of steps of a method for producing filter coefficients for an equalizer in accordance with the present invention.

FIG. 8, numeral 800 is a graphic representation of one embodiment of steps of a method for producing filter coefficients for an equalizer in accordance with the present invention. The method includes the steps of: estimating a response 810 of a communication channel to a signaling pulse; estimating an autocorrelation 820 of noise and interference of the communication channel; computing an array 830 based on the estimation of the response of the communication channel to the signaling pulse and the estimation of the autocorrelation of the noise and interference of the communication channel; designating 840 at least one pivot position in the array; recursively performing the steps of: transforming the array 850 by a sequence of operations; storing 860 at least one element of the at least one pivot position; shifting 870 the at least one element of the at least one pivot position, thereby providing a shifted transformed array; determining 890 whether the shifted transformed array contains at least one non-zero element; and calculating 880 the filter coefficients based on the stored at least one element and the estimation of the response of the communication channel.

The present invention is implemented by a computer program stored on a computer readable medium for producing filter coefficients for equalizers, the computer program comprising the steps of: estimating a response of a communication channel to a signaling pulse; estimating an autocorrelation of noise and interference of the communication channel; computing an array based on the estimation of the response of the communication channel to the signaling pulse and the estimation of the autocorrelation of the noise and interference of the communication channel; designating at least one pivot position in the array; recursively performing the steps of: transforming the array by a sequence of operations; storing at least one element of the at least one pivot position; shifting the at least one element of the at least one pivot position, thereby providing a shifted transformed array; determining whether the shifted transformed array contains at least one non-zero element; and calculating the filter coefficients based on the stored at least one element and the estimation of the response of the communication channel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for producing filter coefficients for an equalizer, comprising the steps of:

estimating a response of a communication channel to a signaling pulse;

estimating an autocorrelation of noise and interference of the communication channel;

computing an array based on the estimation of the response of the communication channel to the signaling pulse and the estimation of the autocorrelation of the noise and interference of the communication channel;

designating at least one pivot position in the array;

recursively performing the steps a–d:

a) transforming the array by a sequence of operations;

b) storing at least one element of the at least one pivot position;

c) shifting the at least one element of the at least one pivot position, thereby providing a shifted transformed array;

d) determining whether the shifted transformed array contains at least one non-zero element; and calculating the filter coefficients based on the stored at least one element and the estimation of the response of the communication channel.

2. The method of claim 1, wherein the array represents a generator matrix $G^{(0)}$, with more rows than columns, according to the equation:

$$R - ZRZ^H = G^{(0)} J \{G^{(0)}\}^H$$

where R represents a matrix based on the estimation of the response of the communication channel to the signaling pulse and the estimation of the autocorrelation of the noise and interference of the communication channel, Z represents a triangular matrix, J represents a signature matrix, and H denotes a Hermitian transpose operator.

3. The method of claim 1, wherein the array represents a generator matrix $G^{(0)}$, with more columns than rows, according to the equation:

$$R - ZRZ^H = \{G^{(0)}\}^H J G$$

where R represents a matrix based on the estimation of the response of the communication channel to the signaling pulse and the estimation of the autocorrelation of the noise and interference of the communication channel, Z represents a triangular matrix, J represents a signature matrix, and H denotes a Hermitian transpose operator.

4. The method of claim 2, wherein each column of the generator matrix is computed according to:

$$G_{i0}^{(0)} \equiv \sum_{j=i}^{N_f} p_j p_{j+i}^* + R_{i0}^*, \, i = 0 \ldots (N_f - 1)$$

$$G_{i1}^{(0)} \equiv \frac{1}{\sqrt{1+\delta}} p_{N_f + N_b - i} \, i = 0 \ldots (N_f - 1)$$

$$G_{i2}^{(0)} \equiv \frac{1}{\sqrt{1+\delta}} p_{N_f - i} \, i = 0 \ldots (N_f - 1)$$

$$G_{i3}^{(0)} \equiv \begin{cases} 0 & i = 0 \\ G_{i0}^{(0)} & i = 1 \ldots (N_f - 1) \end{cases}$$

where $p_j$ is the estimation of the response of the channel to the signaling pulse, $R_{ij}$ is the (i,j)-th element of the estimation of the autocorrelation of the noise and interference, $\delta$ is a positive real number, $N_f$ represents the number of rows in the generator matrix, and $N_b$ is an integer.

5. The method of claim 1, wherein the at least one pivot position is at least one column of the array.

6. The method of claim 1, wherein the at least one pivot position is at least one row of the array.

7. The method of claim 5, wherein the at least one pivot position is the first column of the array.

8. The method of claim 1, wherein the sequence of operations is post-multiplying the array with a sequence of at least one matrix Θ according to $$\Omega J \Omega^H = J$$

where H denotes a Hermitian transpose operator, and J represents the signature matrix.

9. The method of claim 1, wherein the sequence of operations is pre-multiplying the array with a sequence of at least one matrix Θ according to $$\Omega^H J \Omega = J$$

where H denotes a Hermitian transpose operator, and J represents the signature matrix.

10. The method of claim 8, wherein the sequence of the at least one matrix Θ is at least one of:
rotation matrix; and
reflection matrix.

11. The method of claim 9, wherein the sequence of the at least one matrix Θ is at least one of:
rotation matrix; and
reflection matrix.

12. An apparatus for producing filter coefficients for an equalizer, the apparatus comprising:
a channel estimator responsive to a received signal for estimating a response of a communication channel to a signaling pulse;
an interference-plus-noise correlation estimator responsive to the received signal for estimating an autocorrelation of noise and interference of the communication channel;
an initializer coupled to the channel estimator and coupled to the interference-plus-noise correlation estimator for producing an array;
a processor coupled to the initializer for producing a transformed array;
a memory unit coupled to the processor for storing a portion of the transformed array; and
an arithmetic unit coupled to the memory unit and coupled to the channel estimator for calculating the filter coefficients.

13. The apparatus in claim 12, wherein the array is in a form of a generator matrix.

14. The apparatus in claim 13, wherein the generator matrix is computed according to $$G_{i0}^{(0)} \equiv \sum_{j=i}^{N_f} p_j p_{j+i}^* + R_{i0}^*, \; i = 0 \ldots (N_f - 1)$$

$$G_{i1}^{(0)} \equiv \frac{1}{\sqrt{1+\delta}} p_{N_f + N_b - i} \; i = 0 \ldots (N_f - 1)$$

$$G_{i2}^{(0)} \equiv \frac{1}{\sqrt{1+\delta}} p_{N_f - i} \; i = 0 \ldots (N_f - 1)$$

$$G_{i3}^{(0)} \equiv \begin{cases} 0 & i = 0 \\ G_{i0}^{(0)} & i = 1 \ldots (N_f - 1) \end{cases}$$

where $p_j$ is the estimation of the response of the channel to the signaling pulse, $R_{ij}$ is the (i,j)-th element of the estimation of the autocorrelation of the noise and interference, δ is a positive real number, $N_f$ represents the number of rows in the generator matrix, and $N_b$ is an integer.

15. The apparatus in claim 12, wherein the processor comprises:
a preparation unit for shifting the transformed array;
a unitary unit coupled to the preparation unit for producing at least one operations matrix;
a multiplier coupled to the preparation unit and coupled to the unitary unit for multiplying the array and the at least one operations matrix to produce the transformed array.

16. The apparatus in claim 15, wherein the preparation unit comprises
a shift register coupled to the multiplier for shifting the portion of the transformed array;
a delay unit coupled to the shift register for storing the shifted transformed array; and
a switch for selectively receiving one of the array and the stored shifted transformed array.

17. The apparatus in claim 15, wherein the unitary unit produces at least one of:
rotation matrix; and
reflection matrix.

18. A computer program stored on a computer readable medium for producing filter coefficients for an equalizer, the computer program comprising the steps of:
estimating a response of a communication channel to a signaling pulse;
estimating an autocorrelation of noise and interference of the communication channel;
computing an array based on the estimation of the response of the communication channel to the signaling pulse and the estimation of the autocorrelation of the noise and interference of the communication channel;
designating at least one pivot position in the array;
recursively performing the steps a–d:
  a) transforming the array by a sequence of operations;
  b) storing at least one element of the at least one pivot position;
  c) shifting the at least one element of the at least one pivot position, thereby providing a shifted transformed array;
  d) determining whether the shifted transformed array contains at least one non-zero element; and
calculating the filter coefficients based on the stored at least one element and the estimation of the response of the communication channel.

19. The computer program of claim 18, wherein the array represents a generator matrix $G^{(0)}$, with more rows than columns, according to the equation:

$$R - ZRZ^H = G^{(0)} J \{G^{(0)}\}^H$$

where R represents a matrix based on the estimation of the response of the communication channel to the signaling pulse and the estimation of the autocorrelation of the noise and interference of the communication channel, Z represents a triangular matrix, J represents a signature matrix, and H denotes a Hermitian transpose operator.

20. The computer program of claim 18, wherein the array represents a generator matrix $G^{(0)}$, with more columns than rows, according to the equation:

$$R - ZRZ^H = \{G^{(0)}\}^H J G$$

where R represents a matrix based on the estimation of the response of the communication channel to the signaling pulse and the estimation of the autocorrelation of the noise and interference of the communication channel, Z represents a triangular matrix, J represents a signature matrix, and H denotes a Hermitian transpose operator.

21. The computer program of claim 19, wherein each column of the generator matrix is computed according to:

$$G_{i0}^{(0)} \equiv \sum_{j=i}^{N_f} p_j p_{j+i}^* + R_{i0}^*, i = 0 \ldots (N_f - 1)$$

$$G_{i1}^{(0)} \equiv \frac{1}{\sqrt{1+\delta}} p_{N_f + N_b - i} \; i = 0 \ldots (N_f - 1)$$

$$G_{i2}^{(0)} \equiv \frac{1}{\sqrt{1+\delta}} p_{N_f - i} \; i = 0 \ldots (N_f - 1)$$

$$G_{i3}^{(0)} \equiv \begin{cases} 0 & i = 0 \\ G_{i0}^{(0)} & i = 1 \ldots (N_f - 1) \end{cases}$$

where $p_j$ is the estimation of the response of the channel to the signaling pulse, $R_{ij}$ is the (i,j)-th element of the estimation of the autocorrelation of the noise and interference, $\delta$ is a positive real number, $N_f$ represents the number of rows in the generator matrix, and $N_b$ is an integer.

22. The computer program of claim 18, wherein the at least one pivot position is at least one column of the array.

23. The computer program of claim 18, wherein the at least one pivot position is at least one row of the array.

24. The computer program of claim 23, wherein the at least one pivot position is the first column of the array.

25. The computer program of claim 18, wherein the sequence of operations is post-multiplying the array with a sequence of at least one matrix $\Theta$ according to $$\Theta J \Theta^H = J$$

where H denotes a Hermitian transpose operator, and J represents the signature matrix.

26. The computer program of claim 18, wherein the sequence of operations is pre-multiplying the array with a sequence of at least one matrix $\Theta$ according to $$\Theta^H J \Theta = J$$

where H denotes a Hermitian transpose operator, and J represents the signature matrix.

27. The computer program of claim 25, wherein the sequence of the at least one matrix $\Theta$ is at least one of:

rotation matrix; and reflection matrix.

28. The computer program of claim 26, wherein the sequence of the at least one matrix $\Theta$ is at least one of:

rotation matrix; and reflection matrix.

* * * * *